United States Patent
McClung et al.

(10) Patent No.: US 10,404,043 B2
(45) Date of Patent: Sep. 3, 2019

(54) PORTABLE RACKING SYSTEM AND DEVICE FOR DRAWOUT POWER CIRCUIT BREAKERS

(71) Applicant: MarTek Limited, Charleston, WV (US)

(72) Inventors: Charles Mark McClung, Elkview, WV (US); Russell Richard Safreed, III, Saint Albans, WV (US)

(73) Assignee: Martek Limited, LLC, Addison, TX (US)

( * ) Notice: Subject to any disclaimer, the term of this patent is extended or adjusted under 35 U.S.C. 154(b) by 273 days.

(21) Appl. No.: 15/270,137

(22) Filed: Sep. 20, 2016

(65) Prior Publication Data

US 2017/0141550 A1    May 18, 2017

Related U.S. Application Data

(60) Provisional application No. 62/256,743, filed on Nov. 18, 2015.

(51) Int. Cl.
*H02K 7/14* (2006.01)
*H02B 11/127* (2006.01)

(52) U.S. Cl.
CPC .................. *H02B 11/127* (2013.01)

(58) Field of Classification Search
CPC ................................................ H02B 11/127
USPC .................................................... 310/50
See application file for complete search history.

(56) References Cited

U.S. PATENT DOCUMENTS

| | | | |
|---|---|---|---|
| 9,876,335 B2 * | 1/2018 | Bower | H01H 71/0207 |
| 2014/0263777 A1 * | 9/2014 | Anderson, Jr. | B02C 4/42 |
| | | | 241/30 |

* cited by examiner

*Primary Examiner* — Jianchun Qin
(74) *Attorney, Agent, or Firm* — Foley & Lardner LLP (57) ABSTRACT

A portable motorized racking device and system are disclosed for remotely racking (inserting or removing) drawout circuit breakers. The racking device provides a portable, motorized device that can be hand carried to a work location and affixed to the circuit breaker without the need of any modification to the breaker or its enclosure. In one embodiment, among others, the torque that is required to operate the breaker racking mechanism is provided by an electrically powered gearmotor. Attached to the output shaft of the gearmotor is a socket that engages the circuit breaker racking screw. An anti-rotation plate engages a feature, such as a bolt head, opening, hole, or edge, on the racking screw support frame or the breaker face to prevent the gearmotor from rotating while the socket rotates the racking screw.

19 Claims, 7 Drawing Sheets

FIG. 7 in a hand-held carrying case.
PORTABLE RACKING SYSTEM AND DEVICE FOR DRAWOUT POWER CIRCUIT BREAKERS

CLAIM OF PRIORITY

This application claims the benefit of application No. 62/256,743, filed Nov. 18, 2015, which is incorporated herein by reference in its entirety.

FIELD OF THE INVENTION

The present invention relates to the racking of drawout circuit breakers for electrical power that have a racking mechanism operated by rotating a screw mechanism.

BACKGROUND OF THE INVENTION

In larger electrical power systems, a typical drawout power circuit breaker is racked, i.e., connected or disconnected, from the energized electrical supply bus for maintenance or repair by a human operator. The human operator physically rotates a racking screw associated with the breaker in order to connect or disconnect the breaker to or from the electrical supply bus.

In order to effect the operation described above, the human operator stands within arms-reach of the circuit breaker, which also means he or she is in close proximity to the circuit breaker. If the circuit breaker should happen to fail catastrophically, the human operator is at risk of serious injury or death from the resulting arc-blast and flying debris.

SUMMARY OF THE INVENTION

The present disclosure provides various embodiments of a portable electrically driven racking system and device that facilitates the remote racking of drawout power circuit breakers. The portable racking device that is easily affixed to a drawout circuit breaker without the need for permanently modifying the circuit breaker or its enclosure. The portable racking device is also small enough to be stored and transported in a hand-held carrying case.

One embodiment, among others, is a portable racking system that comprises a gearmoter that has an electrically-driven motor connected to a gearbox, a power supply, and circuitry necessary to run the electric motor bi-directionally, while monitoring the output torque of the gearmotor and the number of turns of the racking screw for determining the position of the circuit breaker. A video camera, attached to the racking device allows the human operator to visually monitor the position and progress of the breaker, while the breaker is being racked, by viewing a video screen that is contained in a remote hand-held control station.

Another embodiment, among others, is portable racking system for remotely racking a drawout circuit breaker. The system comprises an electric motor operatively attached to a drive socket for engaging a racking screw associated with the drawout circuit breaker along a rotational axis and for rotating the racking screw around the rotational axis. The system comprises an anti-rotation plate mounted in a fixed position in relation to the motor. The anti-rotation plate is designed and oriented to engage a feature of the circuit breaker racking mechanism support frame or circuit breaker face so that the anti-rotation plate and motor remain stationary when the drive socket rotates the racking screw around the rotational axis. The system comprises a locking disk situated in front of and coplanar with the anti-rotation plate and spaced from the anti-rotation plate, the locking disk capable of rotation about the rotational axis. The locking disk has a cutaway portion so that: (a) when the cutaway portion is rotated to a first rotational position about the rotational axis, the locking disk can extend behind the racking mechanism support frame and the anti-rotation plate can engage the feature, and (b) when the cutaway portion is rotated to a second rotational position about the rotational axis, a part of the locking disk rotates behind a back part of the racking mechanism support frame to thereby clamp the racking mechanism support frame between the anti-rotation plate and the locking disk. The system comprises a controller communicatively coupled to the electric motor, and an operator interface communicatively coupled to the controller to enable an operator to remotely control the motor.

Another embodiment, among others, is a portable racking device for racking a drawout circuit breaker. The racking device comprises a rotation means for engaging and rotating a circuit breaker racking screw associated with the drawout circuit breaker, electric motor means for rotating the rotation means, and attachment means for attaching the electric motor means to the circuit breaker so that the electric motor means remains stationary with respect to the circuit breaker when the drive socket is rotated to screw and unscrew the breaker racking screw.

Another embodiment, among others, is a portable racking device for racking a drawout circuit breaker. The racking device comprises an electric motor operatively attached to a drive socket for engaging a racking screw associated with the drawout circuit breaker along a rotational axis and for rotating the racking screw around the rotational axis. The device comprises an anti-rotation plate mounted in a fixed position in relation to the motor, the anti-rotation plate designed and oriented to engage a feature of the circuit breaker racking mechanism support frame or circuit breaker face so that the anti-rotation plate and motor remain stationary as the drive socket rotates the racking screw around the rotational axis. The device comprises a locking disk situated in front of and coplanar with the anti-rotation plate and spaced from the anti-rotation plate. The locking disk has one or more curved channel screw apertures. The locking disk is capable of rotation about the rotational axis, the locking disk having a cutaway portion so that: (a) when the cutaway portion is rotated to a first rotational position about the rotational axis, the locking disk can extend behind the racking mechanism support frame and the anti-rotation plate can engage the feature, and (b) when the cutaway portion is rotated to a second rotational position about the rotational axis, a part of the locking disk rotates behind a back part of the racking mechanism support frame to thereby clamp the racking mechanism support frame between the anti-rotation plate and the locking disk. The device comprises a spacer plate situated between and separating the anti-rotation plate and the locking disk and a retaining disk attached to the spacer plate with one or more screws. The retaining disk retains the locking disk against the spacer plate. A plurality of bushings are situated in the plurality of curved channel apertures. Finally, a plurality of screws attach the anti-rotation plate to the retaining disk. The screws pass through the bushings in the curved channel screw apertures in the locking disk and permit the locking disk to be rotated about and notwithstanding the screws passing therethrough.

Other embodiments, devices, systems, features, characteristics and methods of the present invention will become more apparent in the "Detailed Description of Embodiments" and accompanying drawings and claims, all of which form a part of this specification.

BRIEF DESCRIPTION OF THE DRAWINGS

The various embodiments and features of the invention will be clearly depicted in the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF EMBODIMENTS

Figure 1A:
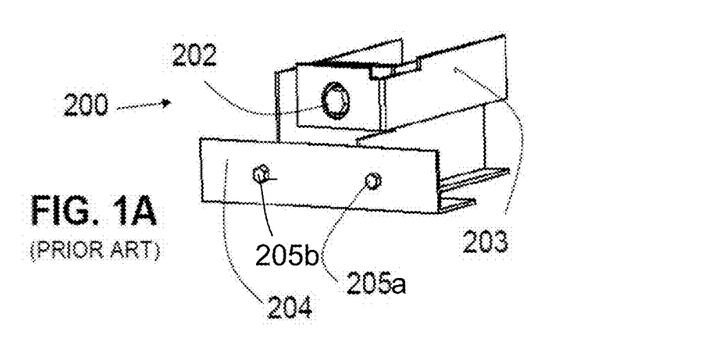
FIG. 1A is a partial perspective view of a typical prior art drawout circuit breaker racking assembly, shown in the normal position.
Figure 1B:
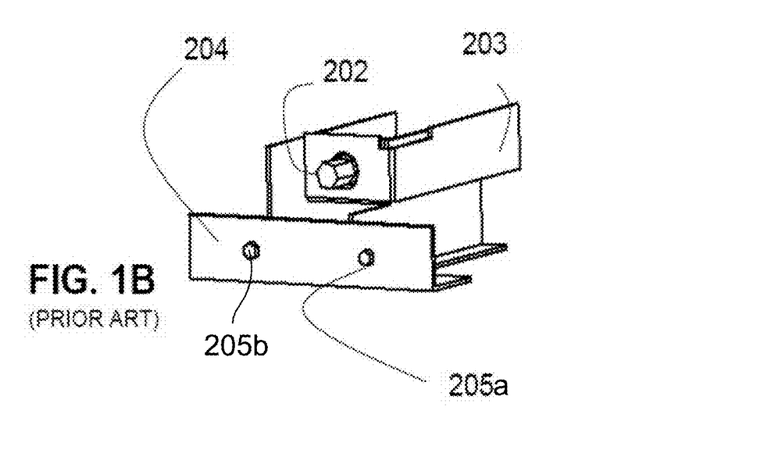
FIG. 1B is a partial perspective view of the drawout circuit breaker racking assembly of FIG. 1A, shown in the racking position.

FIGS. 1 and 2 illustrate various aspects of a device for remotely racking a drawout circuit breaker. According to one embodiment of the present invention, such a device being generally indicated by the reference numeral 100, with a representative circuit breaker racking mechanism being indicated by the reference numeral 200. The circuit breaker racking mechanism 200, as will be appreciated by one skilled in the art, is generally included as a portion of a circuit breaker assembly (not shown). Such a circuit breaker racking mechanism 100 may be applicable to many different types of drawout circuit breakers.

FIG. 1A is a partial view of a typical drawout power circuit breaker racking assembly 200 in the normal position. FIG. 1B is a partial view of the circuit breaker racking assembly 200 in the proper position for racking the circuit breaker on or off an electrical bus. Note the sliding breaker interlock 203 has been pushed back, thus ensuring the circuit breaker is open through an interlock mechanism in the circuit breaker (not shown) and the racking screw engagement nut 202 (shown as hex, in this example) extends outwardly and is accessible.

Figure 2A:
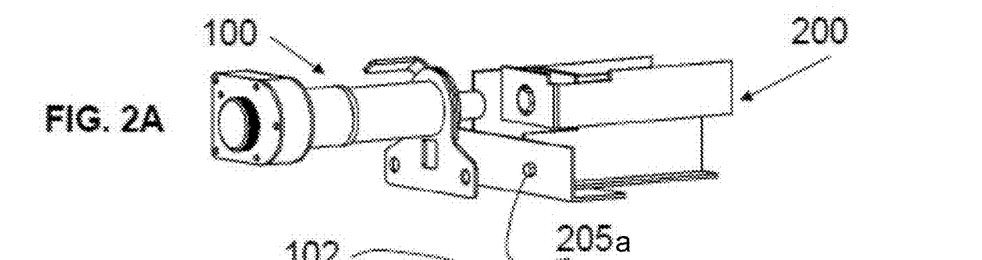
FIGS. 2A, 2B, 2C and 2D are perspective views depicting a portable racking device of the present disclosure and a process for installing same to the drawout circuit breaker racking assembly of FIG. 1A.
Figure 2B:
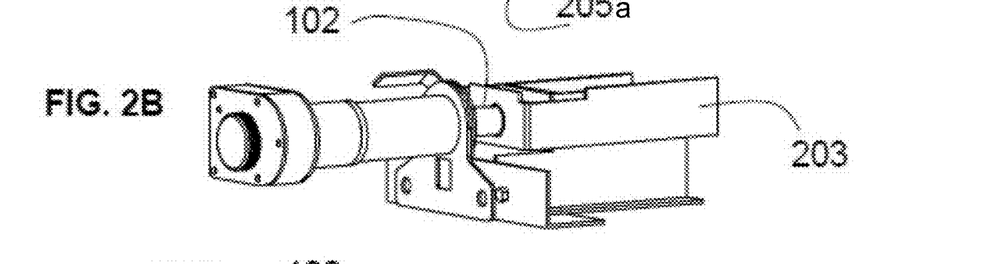
Figure 2C:
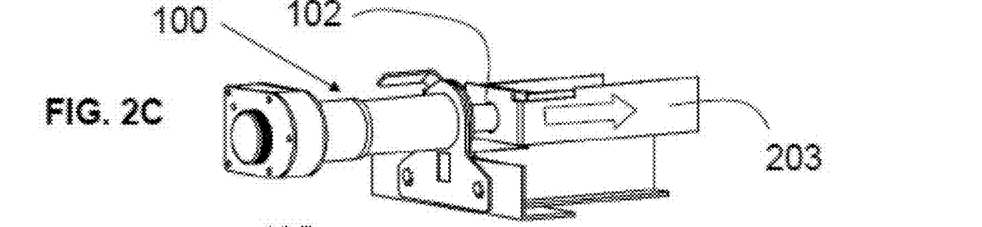
Figure 2D:
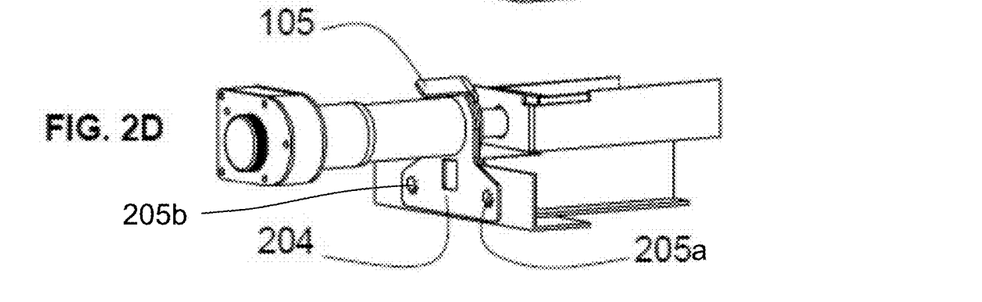

With reference to FIG. 2A, the portable racking device 100 may be temporarily attached to the circuit breaker racking mechanism 200. As shown in FIG. 2B, a drive socket 102 is aligned with a hole in the sliding breaker interlock 203. The hole in the sliding breaker interlock 203 is smaller in diameter than the diameter of the drive socket 102. As depicted in FIG. 2C, the drive socket 102 of the portable racking device 100 is pushed against the sliding breaker interlock 203, displacing the sliding breaker interlock 203 in the direction of the arrow. As the sliding breaker interlock 203 is moved, the interlock 203 exposes the racking screw engagement nut 202 (or screw), as shown in FIG. 1B. FIG. 2C shows the portable racking device 100 fully engaged with the circuit breaker racking assembly 200. In FIG. 2D, a user operated L-shaped handle 105a of the locking disk 105 has been rotated approximately 70 degrees, thereby latching the racking device 100 in place by overlapping the breaker racking mechanism angled support plate 204.

Note that the drive socket 102 can take various forms and configurations, depending upon the nature of the engagement nut 202. In this non-limiting example, it is shown as a female hex nut driver.

Figure 3A:
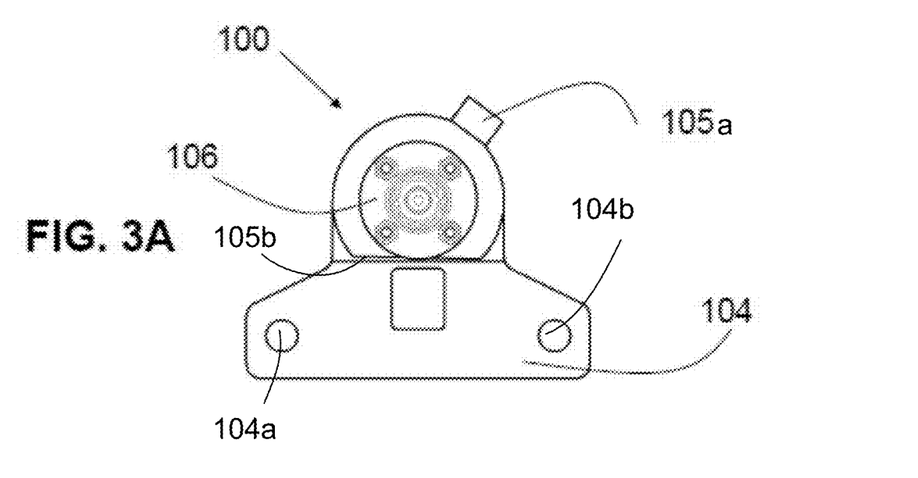
FIG. 3A is a front view of a part of the portable racking device of FIG. 2 showing a locking disk in an unlocked position.
Figure 3B:
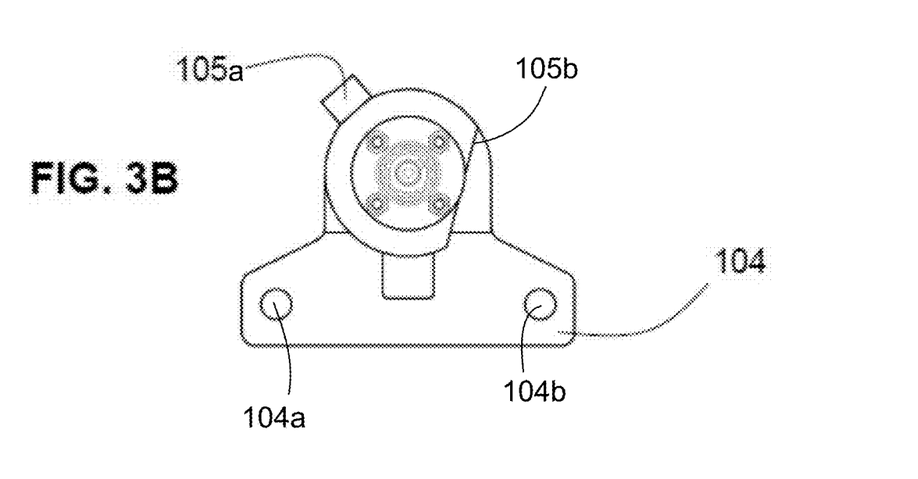
FIG. 3B is a front view of the part of the portable racking device of FIG. 3A with the locking disk in a locked position.
Figure 4:
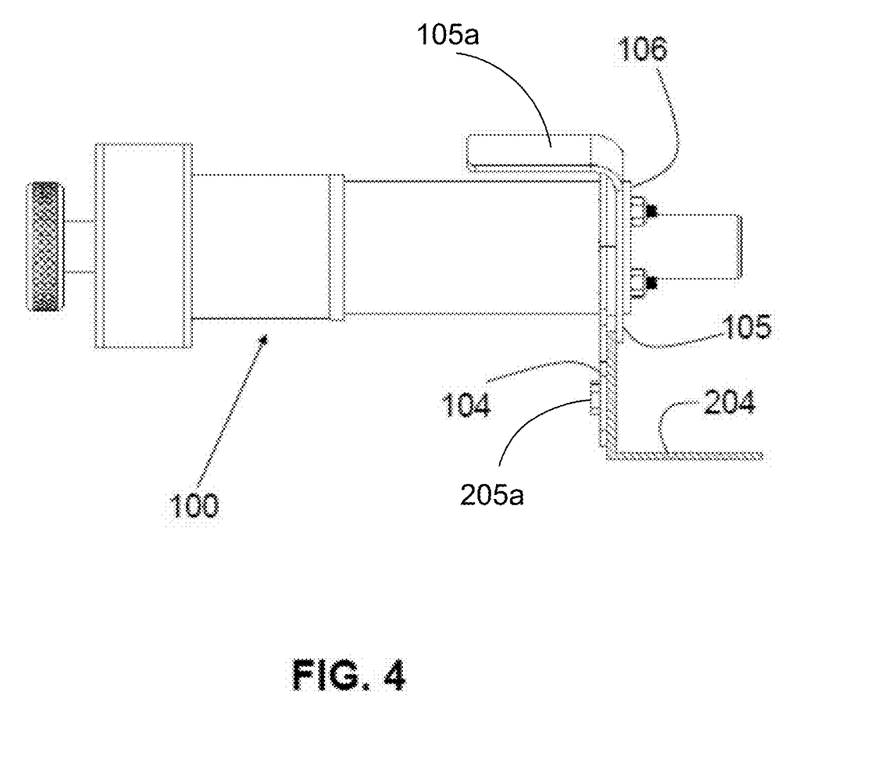
FIG. 4 is a side view of the portable racking device of FIGS. 2 and 3 attached to the circuit breaker racking mechanism.

The locking disk 105 is a generally circular plate with a cutaway portion 105b to enable installation and de-installation of the racking device 100. FIG. 3A is a socket-end view of the portable racking device 100, shown with the locking disk 105 in an unlatched position. FIG. 3B is a socket-end view with the locking disk 105, shown in a latched position. FIG. 3B is shown without retaining disk 106 that is shown in FIG. 3A, to clarify the movement of the locking disk 105. FIG. 4 is a side view of the portable racking device 100 in the latched position. For the sake of clarity, only the circuit breaker racking mechanism angled support plate 204 is shown. Notice how the locking disk 105 secures the portable racking mechanism 100 to the breaker racking mechanism angled support plate 204 and the anti-rotation plate 104 engages the breaker racking mechanism angled support plate 204. In this example, the holes 104a and 104b in the anti-rotation plate 104 receive therein and surround the bolt heads 205a and 205b (hex, in this example) feature on the breaker racking mechanism L-shaped support plate 204, thereby permitting the front surface of the plate 104 to engage the front surface of the plate 204 and preventing rotation of the portable racking device 100.

Figure 5A:
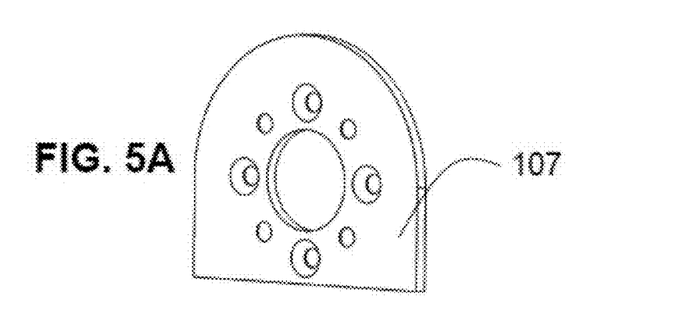
FIG. 5A is a perspective view depicting side A of the spacer plate component of the portable racking device of FIGS. 2 through 4.
Figure 5B:
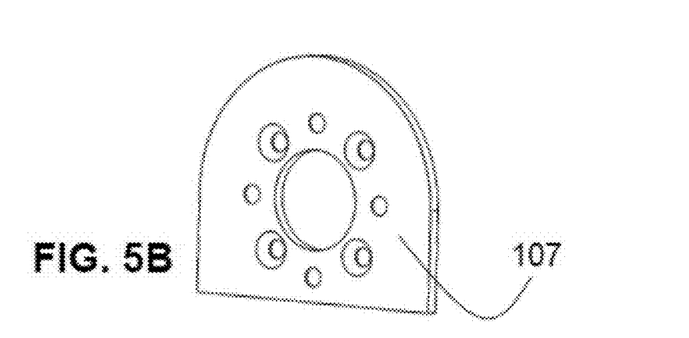
FIG. 5B is a perspective view depicting side B of the spacer plate component of FIG. 5A.
Figure 6:
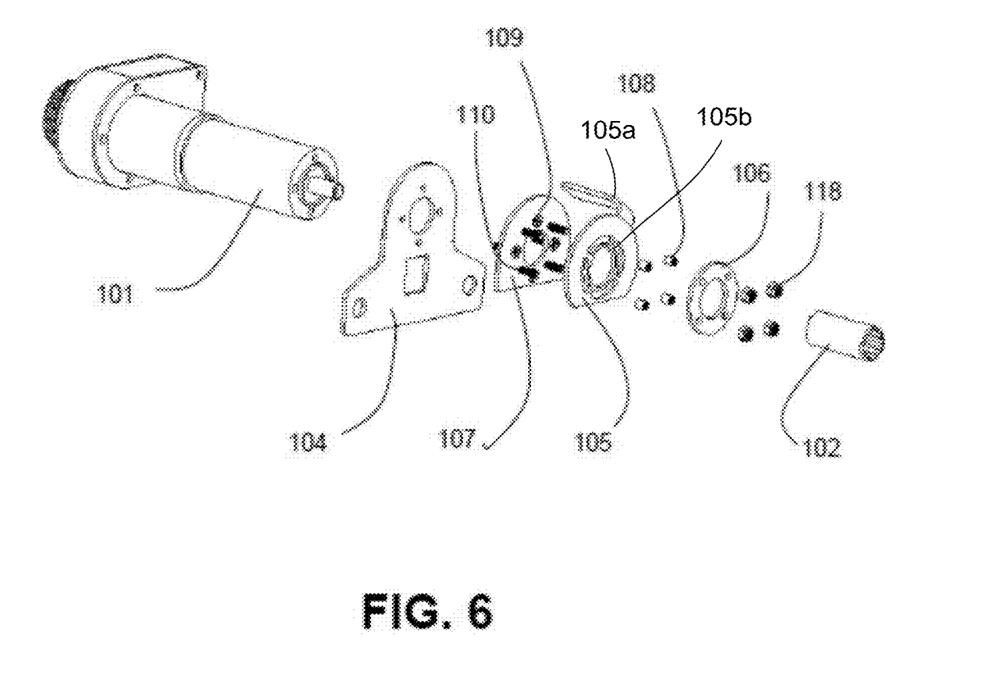
FIG. 6 is an exploded view of an example embodiment of the portable racking device of FIGS. 2 through 5.

FIG. 6 shows an exploded assembly view of the portable racking device 100. Four countersunk screws 109 pass through the spacer plate 107 and the anti-rotation angle 104, into the end of a motor 101, preferably a gearmotor 101. The gearmotor 101 is a combination of an electric motor and gears or a gear box. The motor associated with the gearmotor 101 can be an alternating current (AC) motor, brushed direct current (DC) motor, or brushless DC motor. Four additional countersunk head screws 110 pass from the plate 104 through the spacer plate 107, the locking disk 105, the four spacers 108, and the retaining disk 106, and are held in place by four locknuts 118 that are tightened against the retaining disk 106. The four screws 110 pass through four respective curved channel screw apertures 105b in the locking disk 105 and do not prevent, but permit, the locking disk 105 to be rotated about the rotational axis of the socket 102. The locking disk 105 is free to rotate approximately 70 degrees on the spacers 108. FIG. 5A depicts one side of the spacer plate 107. FIG. 5B depicts the opposite side of the spacer plate 107. A drive socket 102 passes through the hole in the centers of anti-rotation plate 104, spacer plate 107, locking disk 105, and retaining disk 106, and is mated with the gearmotor 101 output shaft.

Figure 7:
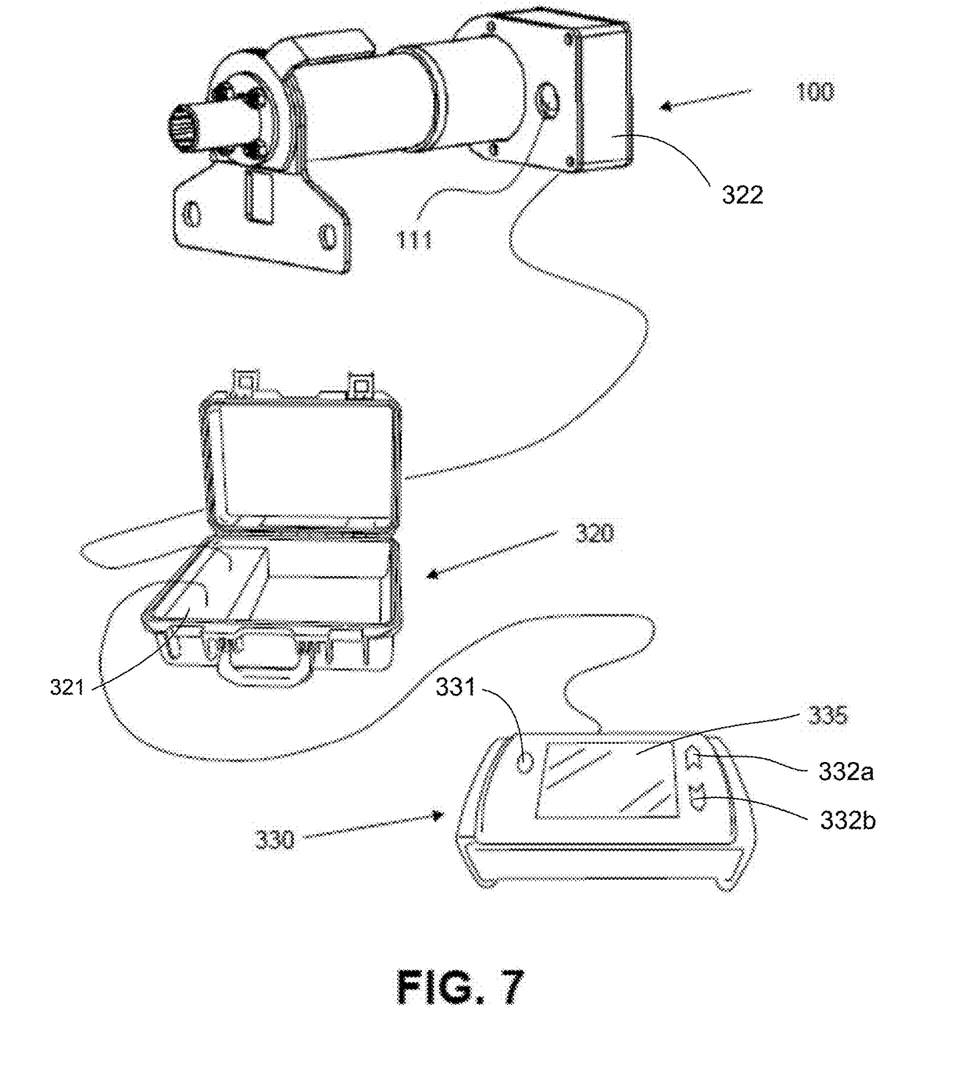
FIG. 7 is a diagram depicting at a high conceptual level an example embodiment of the portable remote racking system that employs the portable racking device of FIGS. 2 through 6.

FIG. 7 depicts the complete portable racking system, the major elements of which are the portable racking device 100, a carrying case 320 with an onboard computer-based controller 321, and a handheld operator station 330 (operator interface). The electrical power supply is associated with the controller 321.

The portable racking device 100 is equipped with a video camera 111 and support circuitry for it in a housing 322. The controller 321 displays the image from the video camera 111 on the video display screen 335 located in the handheld operator station 330.

The handheld operator station 330 enables the operator to operate the gearmotor 101 in a bi-directional manner. The handheld operator station 330 has an enable switch 331, a run forward switch 332a, and run backward switch 332b for controlling the gearmotor 101 of the portable racking device 100. In order to operate the gearmotor 101, the enable switch 331 is depressed and held while one of either of the switches 332a and 332b is depressed.

The controller 321 is designed to monitor the amount of torque being applied to the racking mechanism by monitoring the current that is fed to the gearmotor 101 (or motor). Furthermore, the controller 321 is designed to limit the amount of torque being applied to the racking mechanism. In some embodiments, the controller 321 can superimpose a motor current measurement value the display screen 335 as a function of torque to assist the operator.

In further embodiments, the controller 321 may be designed to display a shaft position indicator on the display screen 335. The shaft position indicator can indicate the distance and direction the breaker has moved. This indicator can be derived from and as a function of the number of revolutions of the racking screw 202. The controller 321 can also be designed to determine when the gearmotor 101 (or motor) stalls based at least in part upon monitoring revolutions of the racking screw 202 or based at least in part upon the shaft position indicator.

It should be emphasized that the above-described embodiments of the present invention, particularly, any "preferred" embodiments, are merely possible non-limiting examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention.

As one such example of a variation, it is possible for the portable racking device 100 to be designed to attach to the angled support plate 204 by a mechanism other than the locking disk 105. For instance, a C-type clamping mechanism could be utilized, which clamps anti-rotation plate 104 to the angled support plate 204.

As another example of a possible variation, the portable racking device 100 can be designed to not rotate without the anti-rotation plate 104. For instance, a C-type clamping mechanism could be utilized, which clamps a feature associated with the gear motor 101 to the angled support plate 204.

As another example of a possible variation, the anti-rotation plate 104 can be designed and oriented to engage any feature, such as a bolt, opening, hole, or edge of the circuit breaker racking mechanism support frame or breaker face.

At least the following is claimed:

1. A portable racking system for remotely racking a drawout circuit breaker, comprising:
    an electric motor operatively attached to a drive socket for engaging a racking screw associated with the drawout circuit breaker along a rotational axis and for rotating the racking screw around the rotational axis;
    an anti-rotation plate mounted in a fixed position in relation to the motor, the anti-rotation plate designed and oriented to engage a feature of the circuit breaker racking mechanism support frame or circuit breaker face so that the anti-rotation plate and motor remain stationary when the drive socket rotates the racking screw around the rotational axis;
    a locking disk situated in front of and coplanar with the anti-rotation plate and spaced from the anti-rotation plate, the locking disk capable of rotation about the rotational axis, the locking disk having a cutaway portion so that:
        when the cutaway portion is rotated to a first rotational position about the rotational axis, the locking disk can extend behind the racking mechanism support frame and the anti-rotation plate can engage the feature; and
        when the cutaway portion is rotated to a second rotational position about the rotational axis, a part of the locking disk rotates behind a back part of the racking mechanism support frame to thereby clamp the racking mechanism support frame between the anti-rotation plate and the locking disk;
    a controller communicatively coupled to the electric motor; and
    an operator interface communicatively coupled to the controller, the operator interface enabling an operator to remotely control the motor.

2. The system of claim 1, wherein the motor comprises an alternating current motor.

3. The system of claim 1, wherein the motor comprises a brushed direct current motor.

4. The system of claim 1, wherein the motor comprises a brushless direct current motor.

5. The system of claim 1, wherein the controller is designed to monitor and limit torque that is applied to the racking mechanism by monitoring current that is fed to the motor.

6. The system of claim 1, further comprising a video camera affixed to the racking system and wherein the operator interface includes a video display that enables a human operator to view a position of the circuit breaker.

7. The system of claim 6, wherein the controller superimposes a motor current measurement value on the video display as a function of torque.

8. The system of claim 6, wherein the controller produces and displays a shaft position indicator on the video display that is indicative of a distance and direction of movement of the breaker, the shaft position indicator derived as a function of revolutions of the racking screw.

9. The system of claim 1, wherein the controller is designed to determine when the motor stalls based at least in part upon monitoring revolutions of the racking screw.

10. The system of claim 1, wherein the feature is a bolt, opening, hole, or edge of the circuit breaker racking mechanism support frame or circuit breaker face.

11. A portable racking device for racking a drawout circuit breaker, the racking device comprising: rotation means for engaging and rotating a circuit breaker racking screw associated with the drawout circuit breaker; electric motor means for rotating the rotation means; and attachment means for attaching the electric motor means to the circuit breaker so that the electric motor means remains stationary with respect to the circuit breaker when a drive socket is rotated to screw and unscrew the breaker racking screw, wherein the attachment means comprises: an anti-rotation plate mounted in a fixed position in relation to the electric motor means, the anti-rotation plate designed and oriented to engage a feature of the circuit breaker racking mechanism support frame or circuit breaker face so that the anti-rotation plate and electric motor means remain stationary as the drive socket rotates the racking screw around a rotational axis, a locking disk situated in front of and coplanar with the anti-rotation plate and spaced from the anti-rotation plate, the locking disk capable of rotation about the rotational axis, the locking disk having a cutaway portion so that: when the cutaway portion is rotated to a first rotational position about the rotational axis, the locking disk can extend behind the racking mechanism support frame and the anti-rotation plate can engage the feature; and when the cutaway portion is rotated to a second rotational position about the rotational axis, a part of the locking disk passes behind a back part of the racking mechanism support frame to thereby clamp the racking mechanism support frame between the anti-rotation plate and the locking disk.

12. The racking device of claim 11, further comprising:
controller means for controlling the electric motor means; and
operator interface means communicatively coupled to the controller means, the operator interface means for enabling an operator to control the electric motor means.

13. The racking device of claim 11, wherein the electric motor means is one or the following: a motor that comprises an alternating current motor, a motor that comprises a brushed direct current motor, or a motor that comprises a brushless direct current motor.

14. The racking device of claim 11, further comprising a controller means for controlling the electric motor means and for monitoring and limiting torque that is applied to the circuit breaker racking mechanism by monitoring electrical current that is fed to the electric motor means.

15. The racking device of claim 11, further comprising:
a controller means communicatively coupled to the electric motor means, the controller means for driving the electric motor means;
an operator interface means communicatively coupled to the controller means, the operator interface means for enabling an operator to control the electric motor means;
a video camera means for enabling the operator to monitor the racking of the drawout breaker.

16. The racking device of claim 15, wherein the video camera means further comprises a video display and wherein the controller means superimposes a motor current measurement value on the video display as a function of torque.

17. The racking device of claim 15, wherein the video camera means further comprises a video display and wherein the controller means produces and displays a shaft position indicator on the video display that is indicative of a distance and direction of movement of the breaker, the shaft position indicator derived as a function of revolutions of the racking screw.

18. The racking device of claim 15, wherein the controller means determines when the electric motor means stalls based at least in part upon monitoring revolutions of the racking screw.

19. A portable racking device for racking a drawout circuit breaker, the device comprising:
an electric motor operatively attached to a drive socket for engaging a racking screw associated with the drawout circuit breaker along a rotational axis and for rotating the racking screw around the rotational axis;
an anti-rotation plate mounted in a fixed position in relation to the motor, the anti-rotation plate designed and oriented to engage a feature of the circuit breaker racking mechanism support frame or circuit breaker face so that the anti-rotation plate and motor remain stationary as the drive socket rotates the racking screw around the rotational axis;
a locking disk situated in front of and coplanar with the anti-rotation plate and spaced from the anti-rotation plate, the locking disk having a plurality of curved channel screw apertures, the locking disk capable of rotation about the rotational axis, the locking disk having a cutaway portion so that:
when the cutaway portion is rotated to a first rotational position about the rotational axis, the locking disk can extend behind the racking mechanism support frame and the anti-rotation plate can engage the feature; and
when the cutaway portion is rotated to a second rotational position about the rotational axis, a part of the locking disk rotates behind a back part of the racking mechanism support frame to thereby clamp the racking mechanism support frame between the anti-rotation plate and the locking disk;
a spacer plate situated between and separating the anti-rotation plate and the locking disk;
a retaining disk that retains the locking disk against the spacer plate; a plurality of bushings corresponding to the plurality of curved channel apertures; and
a plurality of screws attaching the anti-rotation plate to the retaining disk, the screws passing through the bushings in the curved channel screw apertures in the locking disk and permitting the locking disk to be rotated about and notwithstanding the screws passing therethrough.

* * * * *